United States Patent
Kobayashi

(10) Patent No.: US 12,528,450 B2
(45) Date of Patent: Jan. 20, 2026

(54) VEHICLE BEHAVIOR CONTROL APPARATUS

(71) Applicant: Honda Motor Co., Ltd., Tokyo (JP)

(72) Inventor: Shinya Kobayashi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 151 days.

(21) Appl. No.: 18/399,694

(22) Filed: Dec. 29, 2023

(65) Prior Publication Data
US 2024/0300478 A1    Sep. 12, 2024

(30) Foreign Application Priority Data
Mar. 9, 2023    (CN) .......................... 202310220680.7

(51) Int. Cl.
*B60W 30/02*    (2012.01)
(52) U.S. Cl.
CPC .......... *B60W 30/02* (2013.01); *B60W 2520/06* (2013.01); *B60W 2520/16* (2013.01); *B60W 2720/16* (2013.01)
(58) Field of Classification Search
CPC ......... B60W 2520/06; B60W 2520/16; B60W 2720/16; B60W 30/02; Y02T 10/72
See application file for complete search history.

(56) References Cited

U.S. PATENT DOCUMENTS

2021/0094534 A1* 4/2021 Hyun .................... B60W 10/04
2021/0300380 A1* 9/2021 Harada ............... B60L 15/2009

FOREIGN PATENT DOCUMENTS

JP    2007118898        5/2007
JP    2016002991 A  *  1/2016

* cited by examiner

*Primary Examiner* — Wade Miles
*Assistant Examiner* — Jerrod Irvin Davis
(74) *Attorney, Agent, or Firm* — JCIPRNET

(57) ABSTRACT

A vehicle behavior control apparatus, which can improve vehicle behavior stability, is provided. The vehicle behavior control apparatus includes a motor and a pitch angle control apparatus. The motor is connected to at least one of a front wheel and a rear wheel of a vehicle. The pitch angle control apparatus is configured to execute pitch angle control to adjust a pitch angle through adjusting a driving force of each of the front wheel and the rear wheel. The pitch angle control apparatus performs the pitch angle control when a driving torque of the motor belongs to a first driving region not including zero and limits the pitch angle control when the driving torque of the motor belongs to a second driving region. The second driving region is a region before and after positive and negative torque switching of crossing zero.

2 Claims, 4 Drawing Sheets

VEHICLE BEHAVIOR CONTROL APPARATUS

CROSS-REFERENCE TO RELATED APPLICATION

This application claims the priority benefit of China application serial no. 202310220680.7, filed on Mar. 9, 2023. The entirety of the above-mentioned patent application is hereby incorporated by reference herein and made a part of this specification.

BACKGROUND

Technical Field

The disclosure relates to a control apparatus, and in particular to a vehicle behavior control apparatus.

Description of Related Art

In recent years, efforts to provide access to sustainable transportation systems that also take into account vulnerable persons such as the elderly and children among traffic participants have been active. Research and development are devoted to further improving the safety and convenience of traffic through developments related to behavioral stability of vehicles.

Patent Document 1 (Japanese Patent Application Laid-Open No. 2007-118898) discloses a control apparatus for a vehicle in which a braking/driving may can be variably set for each wheel and a predetermined pitch angle is maintained through adjusting the braking/driving force.

In the vehicle, if correction of the driving force is performed near a zero driving force of a driving torque of a motor, a contact surface of a gear of the motor changes with pitch, which may cause a kickback (vibration or hammering sound caused by impact).

In terms of driving stability of the vehicle, how to prevent the occurrence of the kickback of the motor is a topic for designers in the art.

The disclosure aims to improve vehicle behavior stability by not performing pitch angle control near the zero driving force of the motor, thereby also contributing to the development of the sustainable transportation systems.

SUMMARY

The disclosure provides a vehicle behavior control apparatus, which includes a motor and a pitch angle control apparatus. The motor is connected to at least one of a front wheel and a rear wheel of the vehicle. The pitch angle control apparatus is configured to execute pitch angle control to adjust a pitch angle through adjusting a driving force of each of the front wheel and the rear wheel. The pitch angle control apparatus performs the pitch angle control when a driving torque of the motor belongs to a first driving region not including zero and limits the pitch angle control when the driving torque of the motor belongs to a second driving region. The second driving region is a region before and after positive and negative torque switching of crossing zero.

DESCRIPTION OF THE EMBODIMENTS

Figure 1:
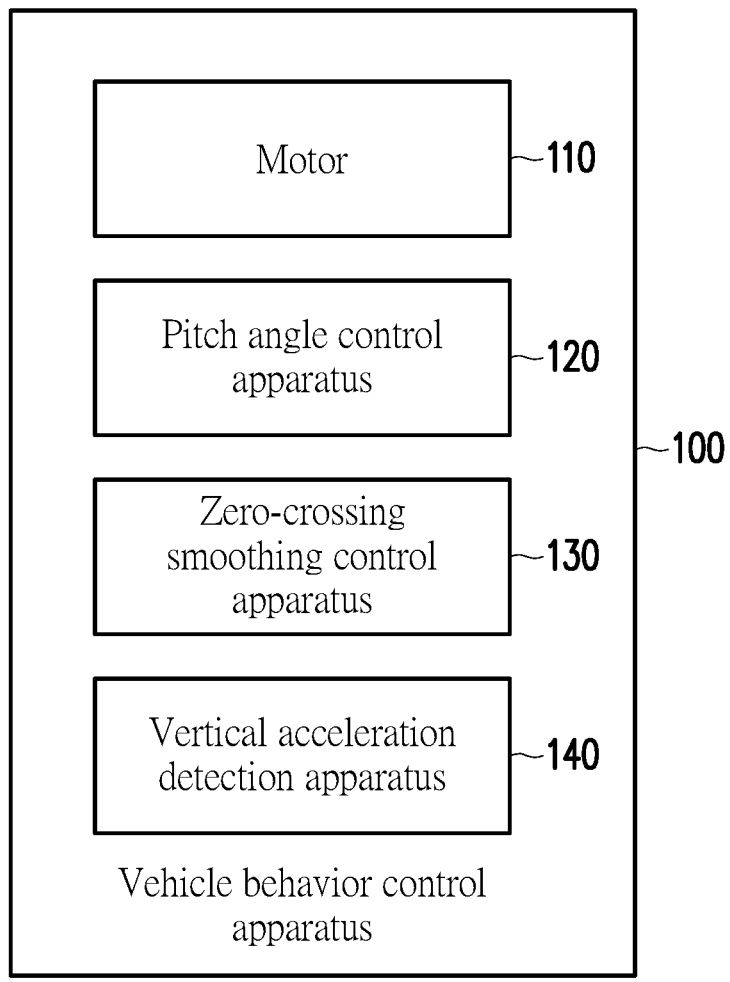
FIG. 1 is a schematic block diagram of a vehicle behavior control apparatus according to an embodiment of the disclosure.

The disclosure provides a vehicle behavior control apparatus, which includes a motor and a pitch angle control apparatus. The motor is connected to at least one of a front wheel and a rear wheel of the vehicle. The pitch angle control apparatus is configured to execute pitch angle control to adjust a pitch angle through adjusting a driving force of each of the front wheel and the rear wheel. The pitch angle control apparatus performs the pitch angle control when a driving torque of the motor belongs to a first driving region not including zero and limits the pitch angle control when the driving torque of the motor belongs to a second driving region. The second driving region is a region before and after positive and negative torque switching of crossing zero.

According to the above structure, through limiting the pitch angle control near a zero driving force of the motor, an occurrence of a kickback of the motor caused by performing the pitch angle control near the zero driving force of the motor can be suppressed, and through performing the pitch angle control in the first driving region where the driving torque of the motor is not zero, riding comfort of the vehicle can be improved.

In an embodiment of the disclosure, the vehicle behavior control apparatus further includes a zero-crossing smoothing control apparatus. The zero-crossing smoothing control apparatus is configured to perform zero-crossing smoothing control when the driving torque of the motor belongs to the second driving region to reduce a change rate of the driving torque of the motor to a predetermined change rate, wherein the first driving region is set as a region different from the second driving region. When the driving torque of the motor belongs to the second driving region, the pitch angle control of the pitch angle control apparatus is limited, and the zero-crossing smoothing control apparatus performs the zero-crossing smoothing control.

According to the above structure, through performing the pitch angle control before the driving torque of the motor belongs to the second driving region including zero, the riding comfort of the vehicle can be improved while suppressing the occurrence of the kickback of the motor, and through performing the zero-crossing smoothing control on the driving torque of the motor belonging to the region before and after the positive and negative torque switching of crossing zero, the occurrence of the kickback of the motor can be further suppressed.

In an embodiment of the disclosure, when the driving torque of the motor belongs to the second driving region, the pitch angle control apparatus controls the pitch angle, so that the change rate of the driving torque of the motor becomes a predetermined change rate.

According to the above structure, when the driving torque of the motor belongs to the second driving region, through performing the pitch angle control on the change rate of the driving torque of the motor according to the predetermined change rate limited by the zero-crossing smoothing control, the riding comfort of the vehicle can be improved while suppressing the occurrence of the kickback of the motor.

In an embodiment of the disclosure, the vehicle behavior control apparatus further includes a vertical acceleration detection apparatus. The vertical acceleration detection apparatus is configured to detect a vertical acceleration of the vehicle. The pitch angle control apparatus adjusts the driving force of each of the front wheel and the rear wheel based on the vertical acceleration. The pitch angle control is performed when the driving torque of the motor belongs to the first driving region, and the pitch angle control is limited when the driving torque of the motor belongs to the second driving region.

According to the above structure, through performing the pitch angle control based on the vertical acceleration, the riding comfort of the vehicle can be improved while suppressing the occurrence of the kickback of the motor when the vehicle is driving on an uneven surface such as a bumpy road surface.

Based on the above, the vehicle behavior control apparatus of the disclosure executes the pitch angle control of the motor approaching the zero driving force within a speed (limit) required by the zero-crossing smoothing control, so the riding comfort of the vehicle when driving on an uneven surface such as a bumpy road surface can be improved while suppressing the occurrence of the kickback of the motor caused by performing the pitch angle control near the zero driving force of the motor. Through performing the pitch angle control in the first driving region where the driving torque of the motor is not zero, the riding comfort of the vehicle can be improved.

In order for the features and advantages of the disclosure to be more comprehensible, the following specific embodiments are described in detail in conjunction with the drawings.

Reference will now be made in detail to the exemplary embodiments of the disclosure, and examples of the exemplary embodiments are illustrated in the drawings. Wherever possible, the same reference numerals are used in the drawings and the description to refer to the same or similar parts.

In the embodiment of the disclosure, pitch angle control is performed when a driving torque of a motor connected to at least one of a front wheel and a rear wheel of a vehicle belongs to a first driving region not including zero, and the pitch angle control is limited when the driving torque of the motor is transferred to a second driving region including zero (a region where zero-crossing smoothing control is executed). As a result, an occurrence of a kickback of the motor can be suppressed and riding comfort of the vehicle can be improved.

FIG. 1 is a schematic block diagram of a vehicle behavior control apparatus according to an embodiment of the disclosure. Please refer to FIG. 1. A vehicle behavior control apparatus 100 of the embodiment is, for example, disposed in a vehicle itself to control a behavior of the vehicle itself. In the embodiment, the vehicle itself includes, for example, a car using an internal combustion engine such as a diesel engine or a gasoline engine as a power source, an electric car using a motor as a power source, a hybrid car having both an internal combustion engine and a motor, etc.

The vehicle behavior control apparatus 100 includes a motor 110, a pitch angle control apparatus 120, a zero-crossing smoothing control apparatus 130, and a vertical acceleration detection apparatus 140. A part or all of the pitch angle control apparatus 120 and the zero-crossing smoothing control apparatus 130 may be implemented by a processor executing a program. Moreover, a part or all of the above apparatuses may also be implemented through hardware such as a large scale integration (LSI) circuit or an application specific integrated circuit (ASIC), or may also be implemented through a combination of software and hardware, and the embodiment does not limit the implementation thereof.

The motor 110 is connected to at least one of a front wheel and a rear wheel of the vehicle and is configured to apply a driving force to the front wheel and the rear wheel.

The pitch angle control apparatus 120 is configured to execute pitch angle control on the vehicle through adjusting the driving force of each of the front wheel and the rear wheel to adjust a pitch angle of the vehicle. In some embodiments, the pitch angle control apparatus 120 executes the pitch angle control before a driving torque of the motor 110 approaches zero to improve riding comfort of the vehicle.

The zero-crossing smoothing control apparatus 130 is configured to perform zero-crossing smoothing control on the driving torque of the motor 110 and reduce a change rate of the driving torque of the motor to a predetermined change rate to improve the riding comfort of the vehicle.

The vertical acceleration detection apparatus 140 is, for example, an acceleration sensor and is configured to detect a vertical acceleration of the vehicle. In some embodiments, the zero-crossing smoothing control apparatus 130 adjusts the driving force of each of the front wheel and the rear wheel based on the vertical acceleration detected by the vertical acceleration detection apparatus 140 to improve the riding comfort of the vehicle when driving on an uneven road surface.

Figure 2:
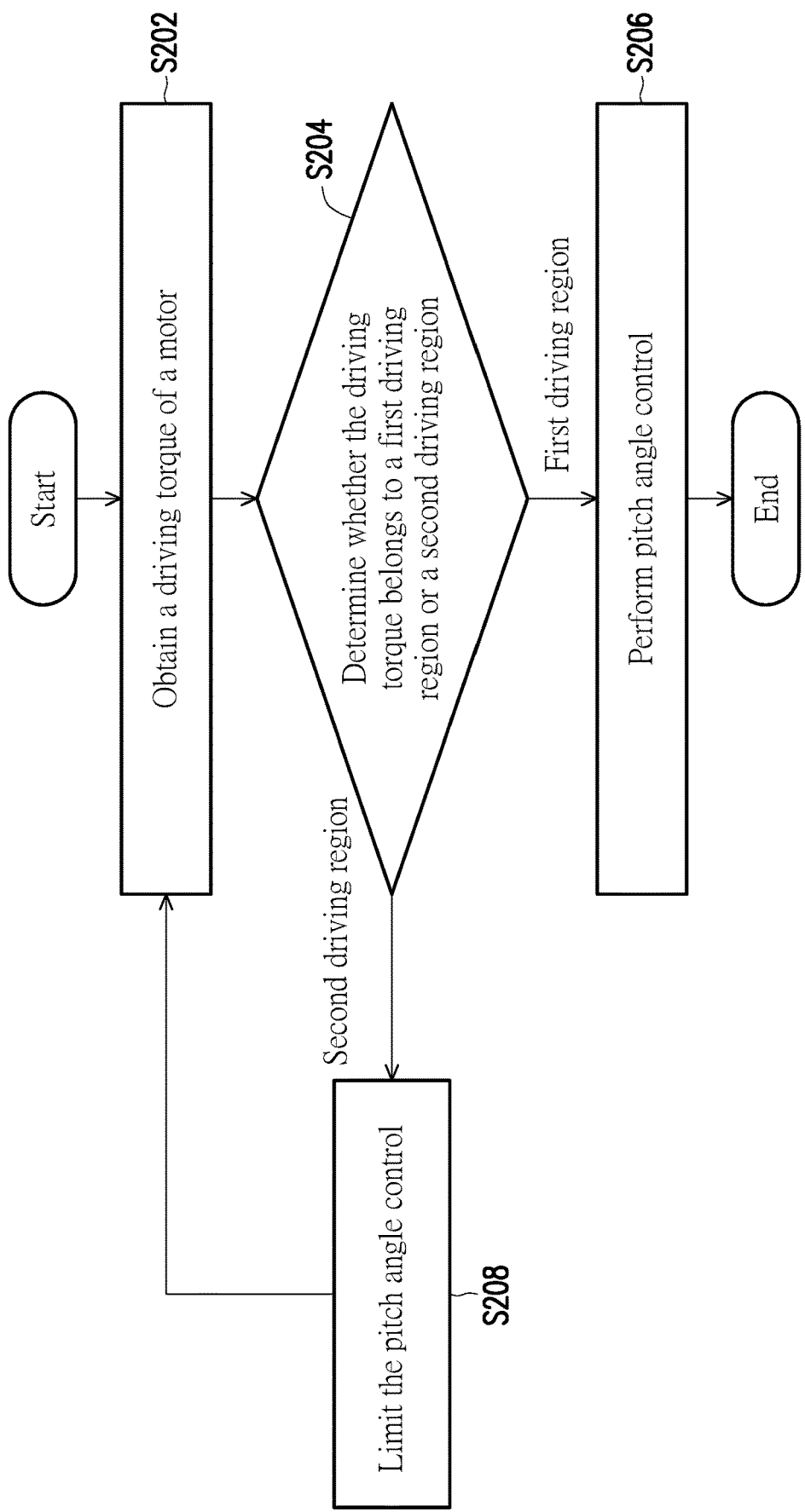
FIG. 2 is a flowchart of a vehicle behavior control method according to an embodiment of the disclosure.

Specifically, FIG. 2 is a flowchart of a vehicle behavior control method according to an embodiment of the disclosure. Please refer to FIG. 1 and FIG. 2. The method of the embodiment is adapted to the vehicle behavior control apparatus 100 of FIG. 1. The detailed steps of the vehicle behavior control method of the embodiment will be described below with reference to each component in the vehicle behavior control apparatus 100.

In Step S202, the vehicle behavior control apparatus 100 obtains the driving torque of the motor 110.

In Step S204, the vehicle behavior control apparatus 100 determines whether the driving torque of the motor 110 belongs to the first driving region or the second driving region. In some embodiments, the second driving region is set as a region before and after positive and negative torque switching of crossing zero, that is, a region near a zero driving force of the motor 110, and the first driving region is set as a region different from the second driving region.

When it is determined that the driving torque of the motor 110 belongs to the first driving region, in Step S206, the pitch angle control apparatus 120 performs the pitch angle control.

When it is determined that the driving torque of the motor 110 belongs to the second driving region, in Step S208, the pitch angle control apparatus 120 limits the pitch angle control. When the pitch angle control apparatus 120 executes the pitch angle control, the pitch angle is, for example, adjusted through limiting the driving force provided to the front wheel and the rear wheel.

Therefore, through limiting the pitch angle control near the zero driving force of the motor 110, an occurrence of a kickback of the motor 110 caused by performing the pitch angle control near the zero driving force of the motor 110 can be suppressed, and through performing the pitch angle control in the first driving region where the driving torque of the motor 110 is not zero, the riding comfort of the vehicle can be improved.

In some embodiments, when the driving torque of the motor 110 belongs to the second driving region, the vehicle behavior control apparatus 100 may perform the zero-crossing smoothing control by the zero-crossing smoothing control apparatus 130 to reduce the change rate of the driving torque of the motor 110 to the predetermined change rate. In some embodiments, the vehicle behavior control apparatus 100 may control the pitch angle by the pitch angle control apparatus 120, so that the change rate of the driving torque of the motor 110 becomes the predetermined change rate.

Figure 3:
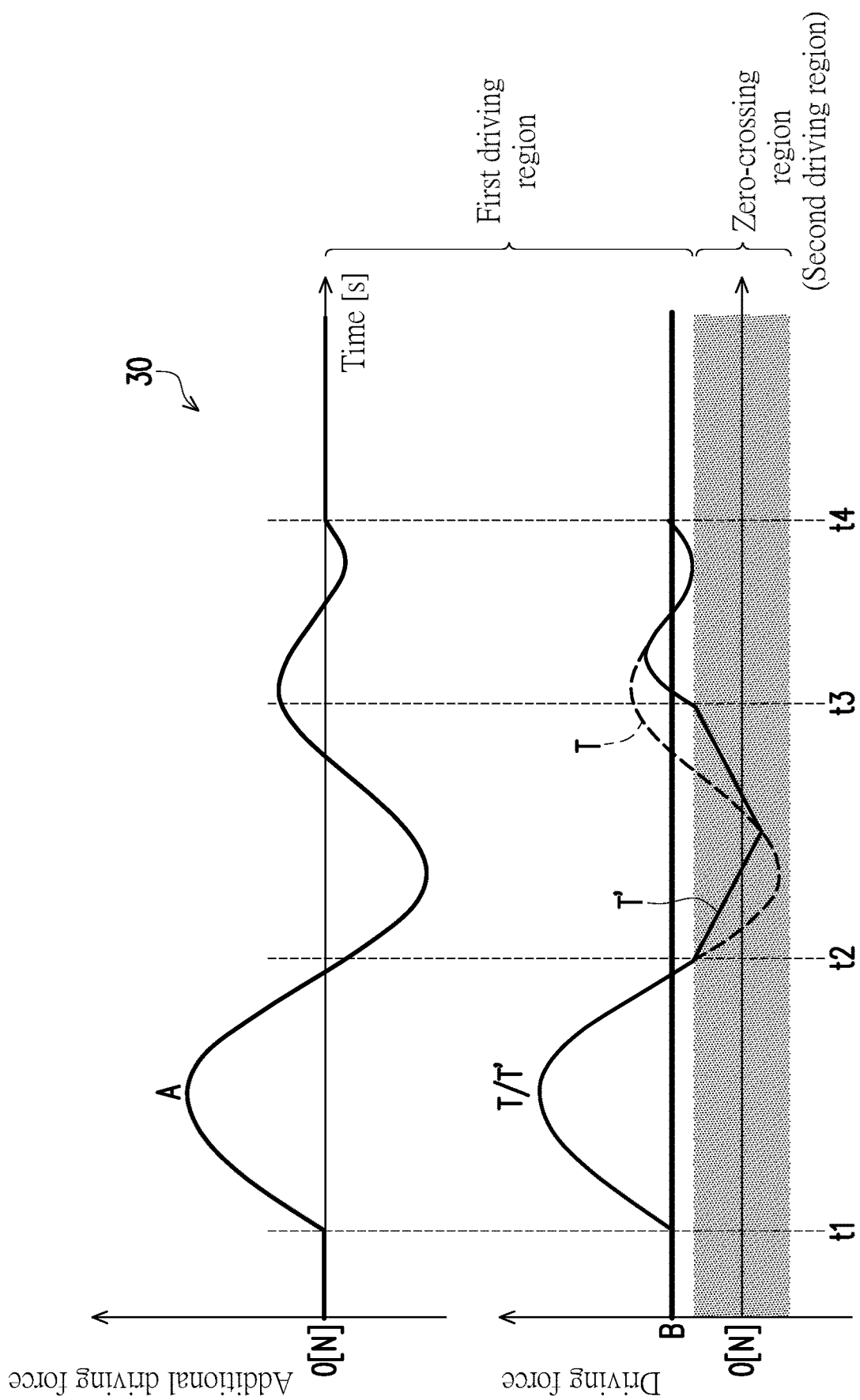
FIG. 3 is an example of changes in an indication driving force according to an embodiment of the disclosure.

For example, FIG. 3 is an example of changes in an indication driving force according to an embodiment of the disclosure. Please refer to FIG. 1 and FIG. 3 at the same time. The embodiment shows a relationship graph 30 of the driving force applied to the front and rear wheels of the vehicle by the motor 110 against time, wherein the vertical axis indicates the magnitude of the driving force of the motor 110 for the front and rear wheels in Newton (N), and the horizontal axis indicates time in seconds.

In an interval from a time 0 to a time point t1, the motor 110 drives the front and rear wheels with a transitional driving force B required by a driver. The transitional driving force B corresponds to an amplitude of the driver stepping on an accelerator. At the time point t1, the pitch angle control apparatus 120 starts performing the pitch angle control, and controls the motor 110 to provide an additional driving force A, so that the driving force applied to the front and rear wheels by the motor 110 as indicated is transformed into an indication driving force T of the transitional driving force B plus the additional driving force A.

In an interval from the time point t1 to a time point t2, the indication driving force T gradually decreases after a brief rise, and at the time point t2, a zero-crossing region (that is, the second driving region) before and after the positive and negative torque switching of crossing zero is entered. At this time, the pitch angle control apparatus 120 limits the pitch angle control.

In an interval from the time point t2 to a time point t3, the vehicle behavior control apparatus 100 limits the pitch angle control executed by the pitch angle control apparatus 120, and the zero-crossing smoothing control apparatus 130 performs the zero-crossing smoothing control on the driving torque of the motor 110, so the change rate of the driving torque of the motor 110 is reduced to the predetermined change rate. Through performing the pitch angle control within a speed (limit) required by the zero-crossing smoothing control, the change rate of the driving force applied to the front and rear wheels is reduced to become the predetermined change rate, which can further suppress the occurrence of the kickback of the motor 110.

Comparing a limited indication driving force T' between the time points t2 and t3 with the original indication driving force T (shown by the dotted line), it can be seen that changes in the limited indication driving force T' are smoother near the zero driving force, so the kickback motor 110 caused by changes in a contact surface of a gear of the motor 110 can be prevented.

Therefore, when the driving torque of the motor 110 belongs to the zero-crossing region, through performing the pitch angle control on the change rate of the driving torque of the motor 110 according to the predetermined change rate limited by the zero-crossing smoothing control, the riding comfort of the vehicle can be improved while suppressing the occurrence of the kickback of the motor 110.

At the time point t3, the indication driving force T' leaves the zero-crossing region to return to the first driving region. At this time, the pitch angle control apparatus 120 returns to the pitch angle control. However, since the indication driving force T' at this time deviates from the original indication driving force T due to zero-crossing processing, transitioning processing needs to be performed on the driving torque of the motor 110 after the zero-crossing processing to suppress sudden changes in the driving torque after the zero-crossing processing.

In an interval from the time point t3 to a time point t4, the pitch angle control apparatus 120 performs speed transitioning processing, for example, according to a response characteristic selected by a transitioning filter to gradually return the current indication driving force T' to the original indication driving force T.

Therefore, through performing the pitch angle control before the driving torque of the motor 110 belongs to the second driving region including zero, the riding comfort of the vehicle can be improved while suppressing the occurrence of the kickback of the motor 110, and through performing the zero-crossing smoothing control on the driving torque of the motor 110 belonging to the region before and after the positive and negative torque switching of crossing zero, the occurrence of the kickback of the motor 110 can be further suppressed.

In some embodiments, the vehicle behavior control apparatus 100 may further detect the vertical acceleration of the vehicle through the vertical acceleration detection apparatus 140, so that the pitch angle control apparatus 120 adjusts the driving force of each of the front wheel and the rear wheel based on the vertical acceleration.

Thus, through performing the pitch angle control based on the vertical acceleration, the riding comfort of the vehicle can be improved while suppressing the occurrence of the kickback of the motor 110 when the vehicle is driving on an uneven surface such as a bumpy road surface.

Figure 4:
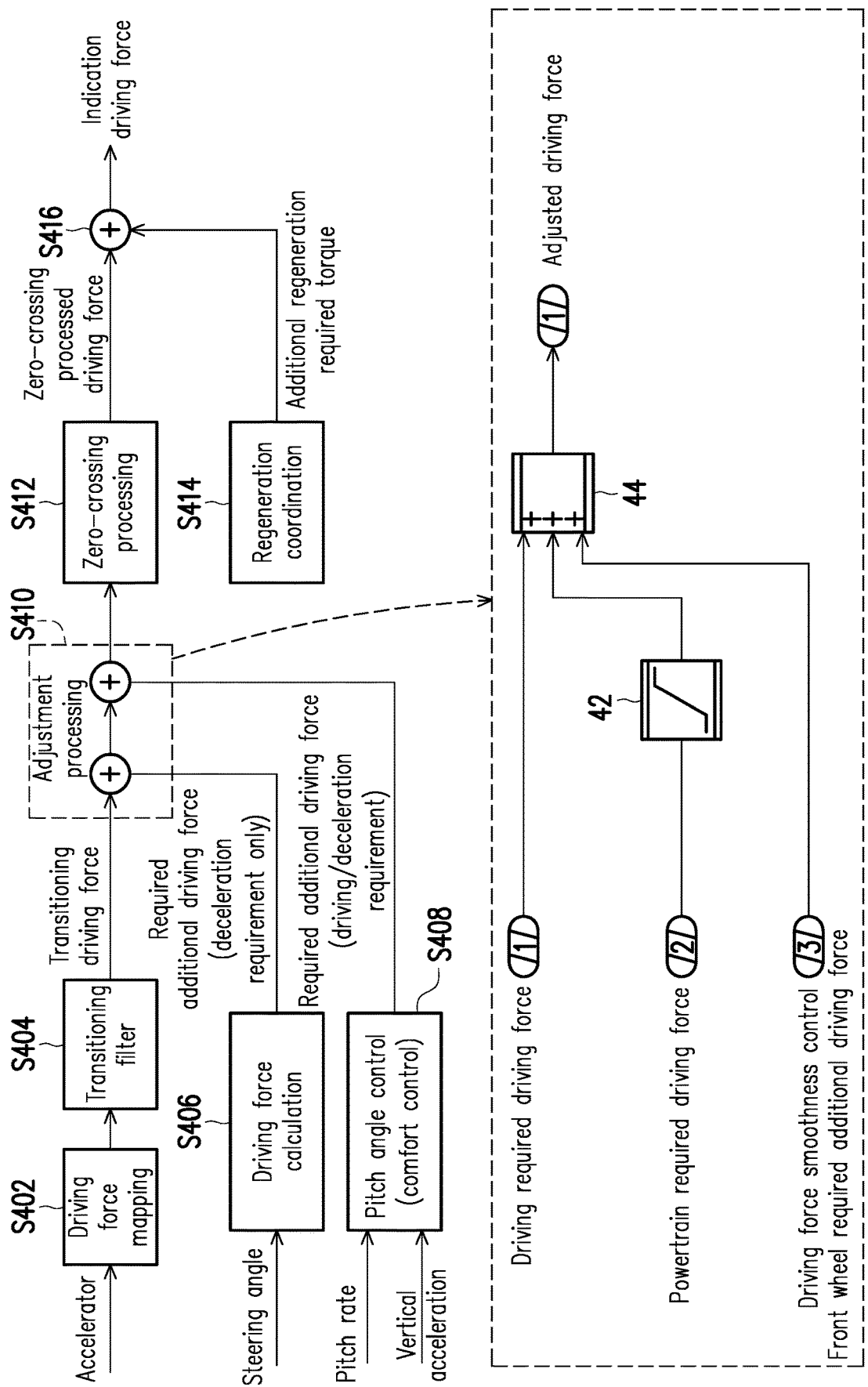
FIG. 4 is an example of generating an indication driving force according to an embodiment of the disclosure.

FIG. 4 is an example of generating an indication driving force according to an embodiment of the disclosure. Please refer to FIG. 3 and FIG. 4 at the same time. The embodiment illustrates the generation of the indication driving force T' in FIG. 3.

In Step S402, the vehicle behavior control apparatus maps the amplitude of the driver stepping on the accelerator into the driving force of the motor for the front wheel and the rear wheel of the vehicle.

In Step S404, the vehicle behavior control apparatus converts the mapped driving force into the transitional driving force through filtering by the transitioning filter.

In Step S406, the vehicle behavior control apparatus calculates the driving force to be applied to the front wheel and the rear wheel according to a steering angle of the vehicle. Through reducing the driving force applied to at least one of the front wheel and the rear wheel when the vehicle turns, the vehicle meets a deceleration requirement when turning to improve the riding comfort of the vehicle.

In Step S408, the vehicle behavior control apparatus performs the pitch angle control on the vehicle according to a pitch rate of the vehicle, which includes adjusting the driving force applied to each of the front wheel and the rear wheel to adjust the pitch angle to implement comfort control. The vehicle behavior control apparatus may output a required additional driving force according to driving of the pitch angle control or the deceleration requirement. In some embodiments, the vehicle behavior control apparatus may also adjust the driving force of the front and rear wheels based on the vertical acceleration of the vehicle during the pitch angle control to improve the riding comfort of the vehicle when the vehicle is driving on an uneven road surface.

In Step S410, the vehicle behavior control apparatus performs adjustment processing on the transitional driving force output in Step S404 according to the required additional driving force output in Steps S406 and S408.

In detail, the transitional driving force output in Step S404 is used as a driving required driving force to be input to an integration apparatus 44 (for example, an adder); the required additional driving force output in Step S406 is used as a powertrain (PT) required driving force to be input to the integration apparatus 44 after filtering (such as filtering out positive values and retaining only negative values) via a filter 42; and the required additional driving force output in Step S408 is used as a front wheel required additional driving force used for driving force smoothness control. After the driving required driving force, the powertrain required driving force, and the front wheel required additional driving force are integrated via the integration apparatus 44, an adjusted driving force may be generated.

In Step S412, the vehicle behavior control apparatus executes the zero-crossing processing on the adjusted driving force, which includes executing the zero-crossing smoothing control on the driving torque when the driving torque of the motor belongs to the region before and after the positive and negative torque switching of crossing zero to reduce the change rate of the driving torque of the motor to the predetermined change rate.

In Step S414, the vehicle behavior control apparatus executes regeneration coordination to output an additional regeneration required torque.

In Step S416, the vehicle behavior control apparatus adds a zero-crossing processed driving force output in Step S412 to the additional regeneration required torque output in Step S414 to output the indication driving force. The indication driving force here is, for example, the limited indication driving force T' shown in FIG. 3.

In summary, the vehicle behavior control apparatus of the disclosure can suppress the occurrence of the kickback of the motor through limiting the pitch angle control near the zero driving force of the motor and/or executing the zero-crossing smoothing control. Through performing the pitch angle control in the driving region where the driving torque of the motor is not zero, the riding comfort of the vehicle can be improved, and through performing the pitch angle control based on the vertical acceleration, the riding comfort of the vehicle when driving on an uneven road surface can be improved.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A vehicle behavior control apparatus, comprising:
a motor, connected to at least one of a front wheel and a rear wheel of a vehicle; and
a pitch angle control apparatus, executing pitch angle control to adjust a pitch angle through adjusting a driving force of each of the front wheel and the rear wheel, wherein
the pitch angle control apparatus is configured to:
perform the pitch angle control when a driving torque of the motor belongs to a first driving region not comprising zero, and
limit the pitch angle control when the driving torque of the motor belongs to a second driving region, wherein the second driving region is a region before and after positive and negative torque switching of crossing zero, wherein the vehicle behavior control apparatus further comprises:
a zero-crossing smoothing control apparatus, performing zero-crossing smoothing control when the driving torque of the motor belongs to the second driving region to reduce a change rate of the driving torque of the motor to a predetermined change rate, wherein
the first driving region is set as a region different from the second driving region,
when the driving torque of the motor belongs to the second driving region, the pitch angle control of the pitch angle control apparatus is limited, and the zero-crossing smoothing control apparatus performs the zero-crossing smoothing control, and wherein
when the driving torque of the motor belongs to the second driving region, the pitch angle control apparatus controls the pitch angle, so that the change rate of the driving torque of the motor becomes the predetermined change rate.

2. The vehicle behavior control apparatus according to claim 1, further comprising:
a vertical acceleration detection apparatus, detecting a vertical acceleration of the vehicle, wherein
the pitch angle control apparatus adjusts the driving force of each of the front wheel and the rear wheel based on the vertical acceleration,
the pitch angle control is performed when the driving torque of the motor belongs to the first driving region, and the pitch angle control is limited when the driving torque of the motor belongs to the second driving region.

* * * * *